United States Patent [19]

Tam

[11] Patent Number: 5,247,606
[45] Date of Patent: Sep. 21, 1993

[54] ADAPTIVELY SETTING ANALOG WEIGHTS IN A NEURAL NETWORK AND THE LIKE

[75] Inventor: Simon M. Tam, Redwood City, Calif.

[73] Assignee: Intel Corporation, Santa Clara, Calif.

[21] Appl. No.: 909,123

[22] Filed: Jul. 6, 1992

Related U.S. Application Data

[63] Continuation of Ser. No. 634,005, Dec. 26, 1990, abandoned.

[51] Int. Cl.$^5$ .................... H03K 19/00; H03K 19/21
[52] U.S. Cl. ...................................... 395/24; 364/807
[58] Field of Search .................... 395/24, 23; 364/807

[56] References Cited

U.S. PATENT DOCUMENTS

| | | | |
|---|---|---|---|
| 4,660,166 | 1/1985 | Hopfield | 395/24 |
| 4,760,437 | 1/1986 | Denker et al. | 395/25 |
| 4,782,460 | 4/1987 | Spencer | 395/24 |
| 4,802,103 | 1/1986 | Faggin et al. | 395/24 |
| 4,903,226 | 2/1990 | Tsiuidis | 395/24 |
| 4,904,881 | 2/1990 | Castro | 395/24 |
| 4,947,482 | 8/1990 | Brown | 364/807 |
| 4,950,917 | 8/1990 | Holler et al. | 395/24 |
| 4,951,239 | 8/1990 | Andes et al. | 364/807 |
| 4,956,564 | 9/1990 | Holler et al. | 307/201 |
| 4,961,002 | 10/1990 | Tam et al. | 307/201 |
| 4,962,342 | 10/1990 | Mead et al. | 307/201 |
| 5,021,693 | 6/1991 | Shima | 395/24 |
| 5,021,988 | 6/1991 | Mashiko | 395/24 |
| 5,028,810 | 7/1991 | Castro | 395/24 |
| 5,053,638 | 10/1991 | Furutani et al. | 395/24 |
| 5,059,814 | 10/1991 | Mead et al. | 395/24 |
| 5,059,920 | 10/1991 | Anderson et al. | 395/24 |
| 5,148,045 | 9/1992 | Oyanagi | 395/24 |

OTHER PUBLICATIONS

Holler et al., "An Electrically Trainable Artificial Neural Network (ETANN) with 10240 Floating Gate", *Proc. Int'l Annual Conf. on Neural Networks*, Jun. 18-22, 1989, II-191-6.

Hansen et al., "A Time-Multiplexed Switched-Capacitor Circuit for Neural Network Applications", *IEEE Int'l Symposium on Circuits and Systems*, May 8-11, 1989 vol. 3, pp. 2177-2180.

Murray, "Pulse Arithmetic in VLSI Neural Networks", *IEEE Micro*, vol. 9 No. 6, Dec. 1989, pp. 67-74.

"VLSI For Artificial Intelligence", edited by Jose G. DelGado-Frias and Will R. Moore, Kluwer Academic Publishers, 1989, pp. 230-233.

"Programmable Analog Synapses for Micro Electronic Neural Networks Using A Hybrid Digital-Analog Approach", by F. J. Mack et al., IEEE International Conference on Neural Networks, Jul. 24-27, San Diego, CA.

"A Pipelined Associative Memory Implemented in VLSI", by Clark et al., *IEEE Journal of Solid-State Circuits*, vol. 24, No. 1, pp. 28-34, Feb. 1989.

*Primary Examiner*—Allen H. MacDonald
*Assistant Examiner*—George Davis
*Attorney, Agent, or Firm*—Blakely, Sokoloff, Taylor & Zafman

[57] ABSTRACT

A method for adaptively setting analog weights in analog cells of a neural network and the like. The process starts by addressing a synapse cell in the network. A target weight for said addressed synapse cell is selected, and the current weight present on the synapse cell is measured. The amplitude and duration of a voltage pulse to be applied to said synapse cell to adjust said synapse cell in the direction of said target weight is calculated using a set of coefficients representing the the physical characteristics of the synapse cell. The voltage pulse is applied to the addressed synapse cell and the new weight of the synapse cell is re-measured. If the synapse cell weight is within acceptable limits of the target weight, the values of the coefficients are saved and the next adjacent synapse cell is addressed until all synapse cells are set. If the synapse cell is not within acceptable limits, new values for the coefficients are calculated in relation to the re-measured weight. A new voltage pulse is generated and applied to the synapse cell. The process is repeated until the weight of the synapse cell is set within an acceptable limit of the target weight.

20 Claims, 9 Drawing Sheets

|  | $V_{SG}$ | $V_{PGM}$ | $V_D$ | $V_S$ |
|---|---|---|---|---|
| MEASURE $V_T$ | $V_{CC}$ | 0 TO $V_{CC}$ | $V_S + \Delta$ <br> ~3V | A REFERENCE LEVEL <br> ~2V |
| | \multicolumn{4}{c}{$V_{PGM}$ IS VARIED UNTIL $I_D$ REACHES A PRE-DETERMINED LEVEL LIKE 1μA TO 10 μA} |
| PROGRAM | ~18V | $V_{PGM}$ | 0V | FLOATING |
| ERASE | ~18V | 0V | $V_{ERASE}$ | FLOATING |

ADAPTIVELY SETTING ANALOG WEIGHTS IN A NEURAL NETWORK AND THE LIKE

This is a continuation of application Ser. No. 07/634,005 filed Dec. 26, 1990, now abandoned.

FIELD OF THE INVENTION

The present invention pertains to the field of associative networks. Specifically, the present invention pertains to adaptively setting weights associated with electronic models of neurons in a neural network.

BACKGROUND OF THE INVENTION

Circuit models have been developed to emulate an associative network of neurons as in a human brain. One such electronic implementation of a neuron is described in "A Neuromorphic VLSI Learning System", by Alspector and Allen, Advanced Research in VLSI, *Proceedings of the* 1987 *Stanford Conference*. In general, such systems provide an electronic representation of a neuron with many weighted inputs, a summing portion and a computational portion for determining a desired functional outcome given the weighted inputs. These neurons are coupled together to form an associative network or neural network. One such prior art neural network is shown in FIG. 1 of U.S. Pat. No. 5,055,897 titled "Semiconductor Cell for Neural Network and the Like", Ser. No. 225,035, filed Jul. 27, 1988 and assigned to the assignee of the present invention. Another related patent application is entitled "Method of Increasing the Accuracy of an Analog Neural Network and the Like", Ser. No. 634,033 filed Dec. 26, 1990, and assigned to the assignee of the present invention.

Training a network is necessary to make the network produce a desired output for a given input. In networks like a neural network, training the network includes programming and measuring analog levels of analog cells or floating gate devices of the network. These networks include EPROM (Electrically Programmable Read Only Memories) and EEPROM (Electrically Eraseable and Programmable Read Only Memories) devices that may use analog levels to increase storage density. In a neural network, training is accomplished by adjusting the weights for connections between nodes. Initially, all numeric weights for connections between neurons, as well as any weighting of input signals, are randomly set to various values. Signals are then input, and the output is observed. If an output signal is erroneous, then a mathematical computation will determine how the weights should be adjusted. Input signals are then re-applied and the output is again re-evaluated, until the output is correct. The technique for back-propagation or feedback of an error correction signal is an important characteristic in training a neural network.

Because training requires incremental adjustment of weighted connections in an electronic model of a neural network, floating gate devices are often used for the synapses or weighted connections. A synapse structure using a floating gate is described in reference to FIG. 2 of U.S. Pat. No. 4,802,103, Faggin et al. Another synapse cell utilizing a floating gate device is illustrated in FIGS. 2a and 2b of the co-pending application Ser. No. 225,035 cited above.

Floating gate devices are electrically chargeable devices typically used in an electronic synapse cell. A floating gate device can be used to represent an weight as an analog level of quantized charge stored on the floating gate. If a floating gate device is used for weighting in a synapse cell, the charge stored on the floating gate can be manipulated thereby affecting the conductivity of the synapse cell. In a neural network, because the level of charge on a floating gate is used to control current flow through a synapse cell, precise control over the level of charge stored on the floating gate is critical to the proper operation of the synapse cell and thus the neutral network. Prior art systems have experienced problems attributable to the inability to accurately set weights using floating gate devices. Floating gate manufacturing variations and physical changes in the devices after use have exacerbated the problems.

The level of charge and thus the weight stored on a floating gate device is set by applying a voltage pulse to the floating gate. The amplitude and duration of the voltage pulse must be carefully adjusted to achieve the proper weight on the floating gate. Prior art systems sometimes use processing logic or a software routine for setting weights in a neural network that uses floating gate devices. This prior art processing logic generally comprises a back propagation method using a binary search or other non-adaptive method for generating the proper voltage pulse (amplitude and duration). In a typical binary search method, an initial voltage pulse is generated and applied to the synapse cell. The charge on the gate is measured and compared to a desired weight to produce an error value. A new voltage pulse is then generated to reduce the error value from that of the prior iteration. In some prior art systems, the amplitude of the voltage pulse is halved or doubled in an attempt to reduce the error value. Since there is no linear relationship between the pulse amplitude and the floating gate charge, this prior art method is very inefficient.

The process of regenerating the voltage pulse continues until the measured weight is within a tolerance level of the desired or target weight. With the prior art binary search method, as many as 10 cycles may be needed to arrive at a correct weight. Also, because the voltage pulse applied to a floating gate device in any synapse call is indiscriminate, a binary search method treats each synapse cell of the network in the same or similar manner. Thus, even though adjacent synapse cells exhibit similar physical properties, the knowledge acquired by setting one synapse cell is not used in adjusting the weight of an adjacent synapse cell. Since there is no linear relationship between the pulse amplitude/duration and the floating gate charge, a linear based weight setting method will require more iterations to acquire a proper weight for each synapse cell processed.

A better method is needed for setting weights more precisely, quickly and adaptively in a neural network using floating gate devices. Greater precision allows a synapse cell to function more accurately in a neural network, and also reduces the overall training time. A reduction in the number of cycles necessary to achieve a correct weight lessens the computational requirements and enhances performance in adjusting the operation of a neural network. Also, an ability to adaptively set weighted values lessens the impact of physical changes in a floating gate device occurring over time.

Other prior art known to Applicant is "An Associative Memory Based On An Electronic Neural Network Architecture" by R. Howard et al., *IEEE Transactions On Electronic Devices* Vol. ED34 Jul. 1987; "An Artificial Neural Network Integrated Circuit Based On MNOS/CCD Principles" by J. Sage, *Neural Network For Computing*, AIP Conference Proceedings, 1986; "A 20V Four-Quadrant CMOS Analog Multiplier", by J. Babanezhad, *IEEE Journal of Solid-Date Circuits*, Vol. SC-20, Dec. 1985; "Programmable Analog Synapses For Microelectronic Neural Networks Using a Hybrid Digital-Analog Approach", by F. J. Mack et al., *IEEE International Conference on Neural Networks*, Jul. 24-27, 1988, San Diego, Calif.; "VLSI for Artificial Intelligence", edited by Jose G. DelGado-Frias and Will R. Moore, Kluwer Academic Publishers, pp. 230-33, 1989; "A Pipelined Associative Memory Implemented in VLSI", by Clark et al., *IEEE Journal of Solid-State Circuits*, Vol. 24, No. 1, pp. 28-34, Feb. 1989; and "A Neuromorphic VLSI Learning System", by Alspector and Allen, Advanced Research in VLSI, Proceedings of the 1987 Stanford conference.

SUMMARY OF THE INVENTION

The present invention provides a method for adaptively setting analog weights in electronic analog cells of a network. This method starts by identifying the address of an initial synapse cell, determining a desired or target weight to which the cell should be set, and generating an initial voltage pulse for driving the cell to the target voltage. A set of coefficient values associated with the initial voltage pulse are also initialized. Once the initial voltage pulse is applied to the cell, the actual weight of the synapse cell is measured and compared to the target voltage. A correction to the voltage pulse with the associated coefficients is determined. The correction factor is necessary in order to reduce the difference between the measured weight and target weight. The new voltage pulse is generated and applied to the synapse cell. After the newly generated voltage pulse is applied, the addressed synapse cell is remeasured. If the difference between remeasured weight and the target weight is within acceptable limits, the calculated correction factor and coefficient values are stored and a new synapse cell can be addressed. However, if the difference is outside the acceptable limits, a new voltage pulse correction factor and associated coefficient values are iteratively calculated and fed back for application to the synapse cell. This process continues until the voltage difference between measured and target weights is within acceptable limits.

One object of the present invention is to provide a method for precisely and adaptively setting weights in a neural network.

Another object of the invention is to provide a method for using the information of one synapse cell to adjust an adjacent synapse cell; thus, increasing the speed of convergence to an appropriate voltage level of the adjacent synapse cell.

Another object of the invention is to reduce the number of iterations required to adjust a synapse cell to a proper value.

These and other objects and aspects of the invention will be apparent to one with ordinary skill in the art from the detailed description of the invention provided herein.

DETAILED DESCRIPTION OF THE PREFERRED EMBODIMENT

A method for adaptively setting analog weights in electronic analog cells of a network is described. In networks like a neural network, setting weights of analog cells in the network includes programming and measuring analog levels of analog cells or floating gate devices of the network. These networks include EPROM (Electrically Programmable Read Only Memories) and EEPROM (Electrically Eraseable and Programmable Read Only Memories) devices that may use analog levels to increase storage density. In a neural network, setting weights is accomplished by adjusting the weights for synapse connections between nodes.

In the following description, numerous specific details are set forth in order to provide a thorough understanding of the invention. However, it will be apparent to one with ordinary skill in the art that these specific details need not be used to practice the present invention. In other instances, well-known structures and circuits have not been shown in detail in order not to unnecessarily obscure the present invention.

In the preferred embodiment of the present invention, synapse cells of a neural network are implemented using floating gate devices. A means for implementing a synapse cell in this manner is well known in those of ordinary skill in the art. Generally, a synapse cell has a floating gate member which is electrically chargeable. The presence or absence of charge on the floating gate member affects the conductivity of the floating gate device. The charge can be accumulated or removed from the floating gate device by applying a voltage pulse to the device. It is well known to those of ordinary skill in the art that the quantity of stored charge (i.e. weight) on the floating gate is determined by the amplitude of the applied voltage pulse and the length of time (duration) the voltage is applied. The amount of charge accumulated or removed from the floating gate is thus a function of the amplitude and duration of the applied pulse. Techniques for accumulating (programming) and removing (erasing) charge from a floating gate are well known to those of ordinary skill in the art; however, efficiently and adaptively producing the desired quantity of charge (i.e. weight) on a floating gate has proven to be particularly difficult. The present invention solves this problem.

The quantity of charge (i.e. weight) stored on a floating gate is subject to significant variation based on the physical characteristics of a floating gate device. Such factors include cell geometry, oxide thickness, tunneling characteristics, etc. In the present invention, numerical values representing these physical parameters are grouped to create coefficients which are used to predict and correct the quantity of charge stored on a floating gate. The quantity of charge stored on the floating gate corresponds to the weight for the synapse cell. Further, a process is used to predict the amount of charge to be induced on or off a floating gate to produce the desired or target weight. Charge to be induced is represented in the form of a voltage pulse needed to program (i.e. add charge to the floating gate) or erase (i.e. remove charge from the floating gate) a synapse cell to a target level. After applying a voltage pulse, the predicted charge is compared with the actual charge transferred by measuring the voltage on the synapse cell. The difference between the predicted charge and the actual charge transferred allows a correction factor to be determined which corresponds to the physical parameters associated with the particular floating gate device. Thus, an ajustable correction factor can be used to create an efficient and adaptive feedback process for precisely setting weights in a synapse cell.

Additionally, once a correction factor associated with one particular synapse cell in a memory array or neural network is determined, that information is used as a starting point for setting a weight of an adjacent synapse cell in the array. Since adjacent cells typically have similar physical properties, adjacent cells also tend to have the same or similar correction factor. Thus, convergence to a control correction factor or coefficient associated with a target weight for adjacent cells is enhanced by eliminating random or non-adaptive initial weight and coefficient values for adjacent cells.

Figure 1A:
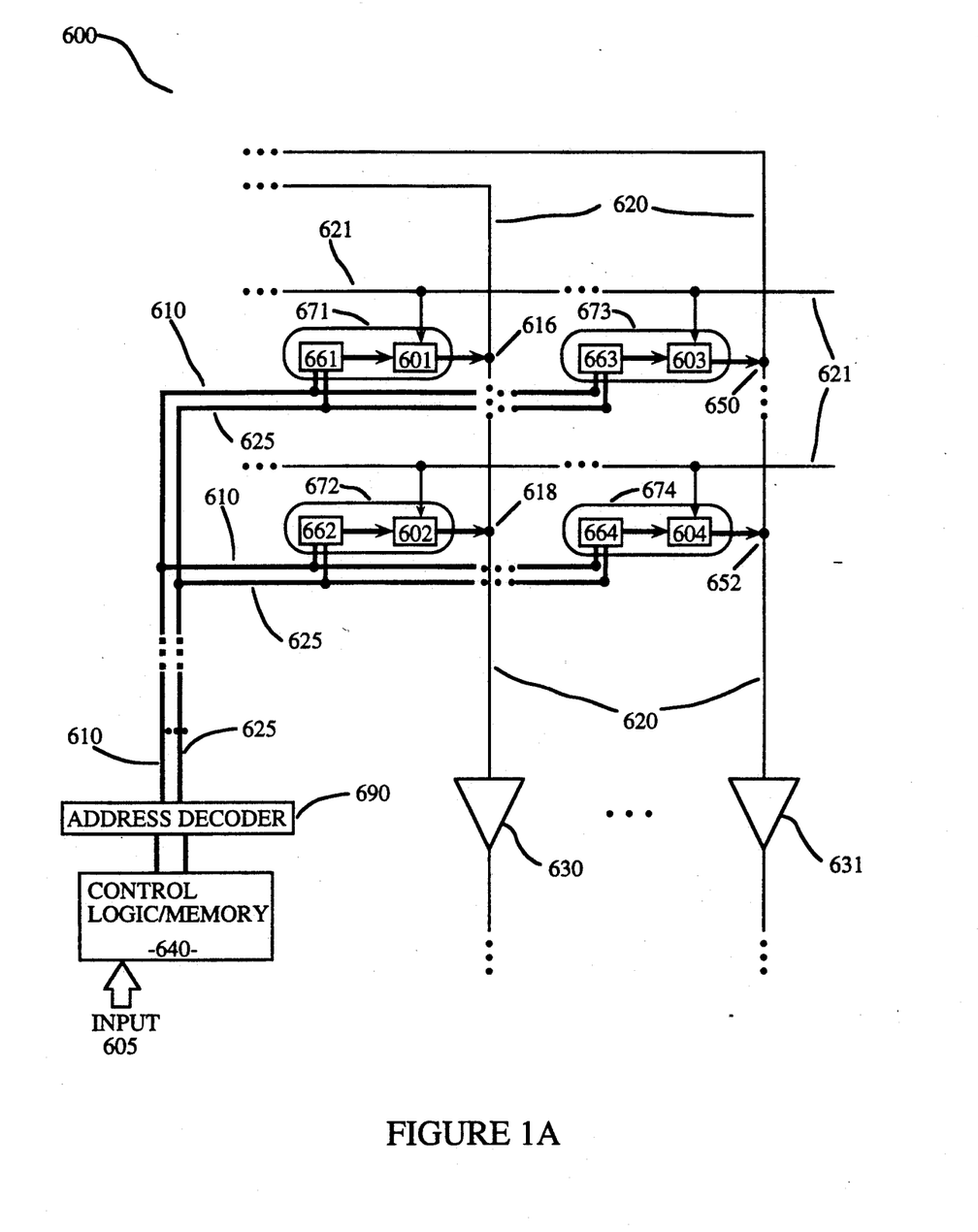
FIG. 1a is an illustration of an electronic model of a neural network.

Referring to FIG. 1a, a neural network 600 is illustrated. Neural network 600 comprises a plurality of synapse cells 671–674 connected by input lines 621 and synapse output lines 620 as shown. Each synapse cell is comprised of a computational component (601–604) and a weighting component (661–664). The weighting component (661–664) includes a floating gate device that stores a level of charge corresponding to the weight of the synapse cell. The computational component (601–604) uses the input provided to it from input lines 621 and the input provided by the weighting component (661–664) to produce an output on synapse output lines 620. Synapse output lines 620 are each coupled to a neuron or summing amplifier. Two such neurons 630 and 631 are shown in FIG. 1a.

In order to set the weight of a particular weighting component of a synapse cell, weight setting lines 610 are coupled to the weighting component of each synapse cell in the network. In order to measure the weight set for a particular weighting component of a synapse cell, weight measuring lines 625 are also coupled to the weighting component of each synapse cell in the network. Weight setting lines 610 and weight measuring lines 625 are coupled to an address decoder 690 which is coupled to control logic/memory unit 640. A particular synapse cell is addressed by applying an address of the cell to address decoder 690. The address decoder 690 then produces control signals for the appropriate synapse cell via weight setting lines 610. The processing logic of the preferred embodiment of the present invention operates from within control logic/memory unit 640.

Input line 605 to control logic/memory unit 640 is provided for specifying a target weight for a cell to be addressed. An initial set of coefficients are also provided to control logic/memory unit 640 via input line 605. In the preferred embodiment, two coefficients are initially provided, mainly $B_{pgm}$ (a coefficient associated with programming or adding charge to the floating gate) and $B_{ers}$ (a coefficient associated with erasing or removing charge from a floating gate). $B_{pgm}$ and $B_{ers}$ are coefficient values representing the physical characteristics of a floating gate device and are used to produce an adaptive correction to the weight setting process. Since the physical characteristics associated with programming and erasing a floating gate are inherently different, two coefficients are provided in the preferred embodiment. In an alternative embodiment, a single coefficient may be used to represent both the program and erase characteristics. In another alternative embodiment of the present invention, a plurality of coefficients may be used to represent various specific physical parameters associated with a floating gate such as tunneling characteristics, oxide thickness, or geometry. In addition to the target weight and initial coefficients $B_{pgm}$ and $B_{ers}$, input line 605 is used to provide an initial address of the first synapse cell to be processed by the present invention. Once the initial cell address is specified, the subsequent adjacent cell addresses are generated by the processing logic of the present invention. In an alternative embodiment, an initial cell address is chosen randomly. Subsequent cell addresses may also be chosen randomly or cells adjacent to the initial randomly addressed cell may be selected.

In order to illustrate the operation of the present invention, synapse cell 671 is arbitrarily chosen as an example of an initial cell to be set to a target weight. Cell 671 is addressed by applying its cell address to address decoder 690 which in turn produces the proper control signals for cell 671 via lines 610 as illustrated in FIG. 1a.

Figure 1B:
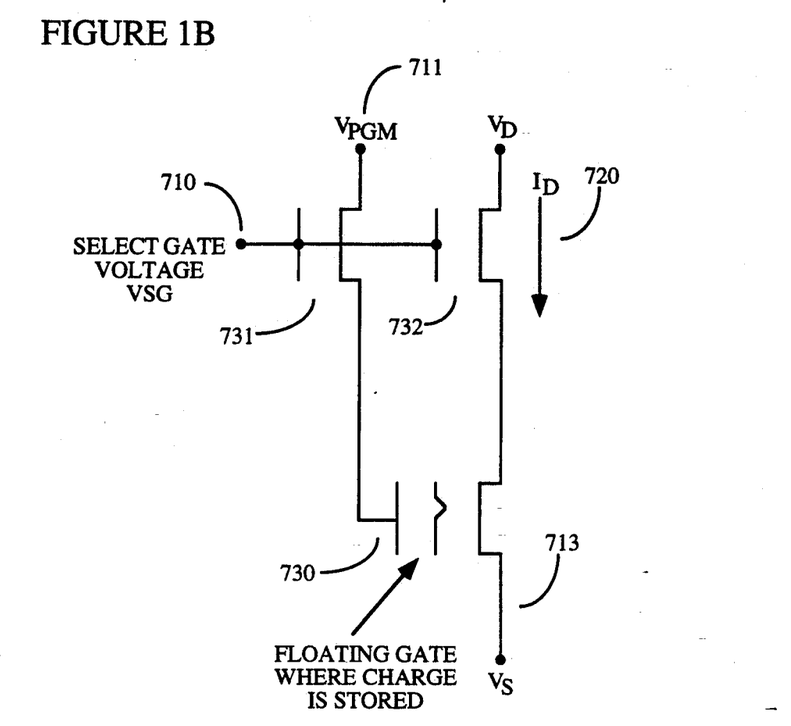
FIG. 1b is an illustration of the signal lines provided for measuring, programming and erasing a synapse cell.
Figure 1C:
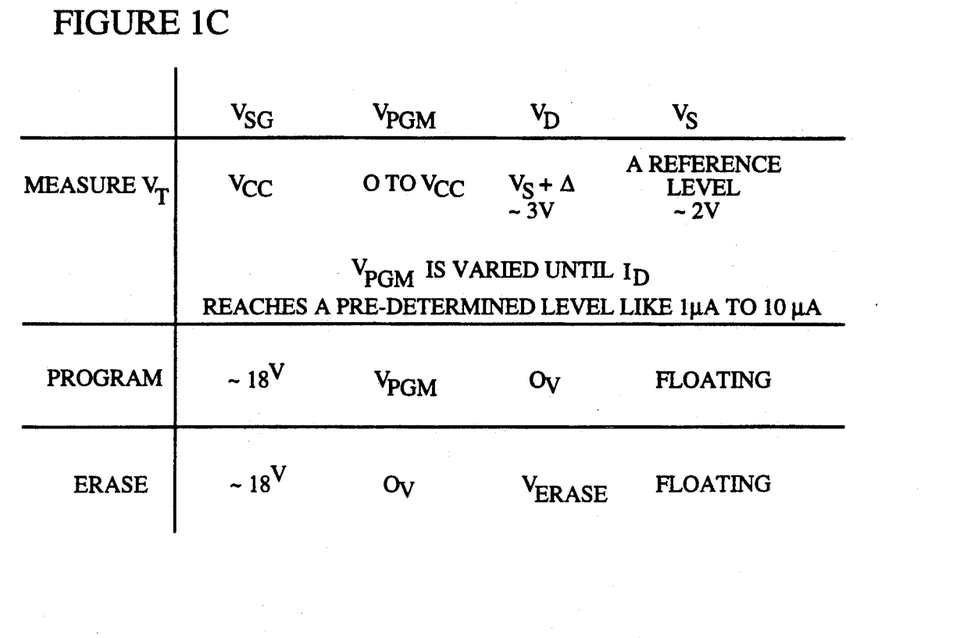
FIG. 1c is an illustration of the signals on the signal lines during measuring, programming and erasing operations.

Referring now to FIG. 1b, one of these control signals provided to cell 671 is a select gate voltage $V_{sg}$ 710 signal used to select a particular weighting component for the weight setting or measuring process. Another signal $V_{pgm}$ 711 is used to provide a program or erase voltage to the weighting component. $V_{pgm}$ 711 is also used to measure the weight on the cell by varying the $V_{pgm}$ 711 voltage until the current $I_d$ 720 reaches a predetermined level. Another signal $V_d$ 712 is used to set up a differential voltage with $V_{pgm}$ 711. By varying the voltage of $V_d$ 712 in relation to the voltage $V_{pgm}$ 711, charge can be induced to flow on to (programmed) or off from (erased) the floating gate device 730. FIG. 1c illustrates a table 750 showing the voltage levels of each of these signals during the cell measuring step, the programming step and the erasing step. After the cell 671 has been addressed, the present weight of cell 671 may be measured and the weight of the cell may be programmed or erased by applying appropriate voltage levels to the signal lines described above and illustrated in FIG. 1b.

With the measured present weight of synapse cell 671 and the target weight for cell 671, the processing logic of the present invention determines whether charge needs to be added or removed from the floating gate device in cell 671. Using this information along with $B_{pgm}$ and $B_{ers}$ coefficients, a correction to the amplitude and duration of a voltage pulse can be calculated for setting cell 671 to the target weight. The voltage pulse is applied to cell 671 over weight setting line 610. Once the voltage pulse is applied, the weight of cell 671 stabilizes to a new adjusted value.

Because the weight of cell 671 has been adjusted, the weight of cell 671 is re-measured using any of various methods including the one described above. After re-measuring the newly adjusted weight of cell 671, the adjusted weight is tested against the target weight to determine if the adjusted weight of cell 671 is set to the target weight within acceptable limits. If the charge or weight of cell 671 is not within acceptable limits, $B_{pgm}$ and $B_{ers}$ coefficient must be recalculated, and a new voltage amplitude and duration for either programming or erasing cell 671 accordingly calculated and applied. The control logic/memory 640 is used to calculate a new voltage and duration for cell 671. This process will continue until cell 671 is programmed to the target weight within an acceptable tolerance.

After cell 671 is set to an acceptable weight, $B_{pgm}$ and $B_{ers}$ coefficients associated with the voltage pulse that produced the correct weight are stored in control logic/memory 640. Next, an adjacent cell is addressed, and the process described above is repeated for the new cell. Notably, the initial $B_{pgm}$ and $B_{ers}$ coefficients for the adjacent cell are set to values associated with the previously set cell. This adaptive weight setting process will continue until the weight of all cells in network 600 are set. Once all desired cells in network 600 are set to the target weight, the information learned in the weight setting process may be retained. Specifically, the $B_{pgm}$ and $B_{ers}$ coefficients may be retrieved and saved.

Processing Logic of the Preferred Embodiment

Referring to FIGS. 4-9, flow charts are employed to best describe a method for adaptively setting weights to a synapse cell. The processing logic of the present invention as depicted in FIGS. 4-9 can be programmed using any of various programming languages, including C, Pascal, Fortran, etc. It will be apparent to those skilled in the art that other alternative programming languages may be used.

The processing logic of the preferred embodiment is operably disposed within a random access memory or read-only memory located in control logic/memory 640, and executed by a processor also therein. A means for initially loading and activating the processing logic is available using techniques well known to those of ordinary skill in the art. Once activated, the processing logic of the present invention executes in the manner described below starting at the bubble labeled 501 shown in FIG. 4.

Upon activation, the processing logic of the present invention begins by initializing the parameters used by the logic. This initialization occurs in processing box 502 of FIG. 4. The parameters initialized in box 502 include the coefficients $B_{pgm}$ and $B_{ers}$. These coefficients are initialized to values best approximating the physical characteristics of the synapse cell or floating gate devices being processed (i.e. devices being set to a target weight). Other parameters initialized in box 502 include the initial address of the first synapse cell to be processed. The initial address may be set to the address of any cell in the memory array. Once the initial address is specified, subsequent addresses are generated by incrementing the initial address thereby addressing an adjacent cell. If the address generated extends beyond a predetermined limit for the memory array or neural network, the address is reset to the top of the array. In this manner, the entire neural network can be processed. In addition, specific portions of the network can be targeted and processed without the need to process the entire array.

One the coefficients and initial cell address are initialized, processing continues at processing box 503. At box 503, a target voltage value ($V_{target}$) is initialized. $V_{target}$ is the charge voltage or weight to be assigned to the addressed synapse cell. $V_{target}$ is provided to control logic/memory unit 640 via input line 605. Note that the mathematical meaning of synapse weight is typically opposite to the physical quantity of floating gate voltage or $V_t$.

Also in processing box 503, the charge ($V_{teo}$) currently present on the addressed synapse cell is measured. The difference ($\Delta V_t$) between the target weight ($V_{target}$) and the measured weight ($V_{teo}$) is computed as shown by the following equation:

$$\Delta V_t = V_{target} - V_{teo} \qquad (1)$$

Processing control then passes to decision box 550.

Continuing at decision box 550, difference between target and measured weight of the addressed cell is tested with zero or an acceptable tolerance level. If the difference is equal to zero or within tolerance (processing path 551), no further processing is required for this cell; thus, processing continues for the next cell at the bubble labeled A in FIG. 5. In the more likely case, the $\Delta V_t$ value will be non-zero or outside of a tolerance level and processing will pass to decision box 504 via processing path 552.

At decision box 504, $\Delta V_t$ is tested with zero in order to determine if $V_{target}$ is greater than or less than $V_{teo}$. For values of $\Delta V_t$ greater than zero (processing path 514), a program synapse cell operation is required. In this case, the target voltage $V_{target}$ is greater than the measured voltage $V_{teo}$; therefore, charge must be added to the synapse cell to increase its stored voltage to the target level. For values of $\Delta V_t$ less than zero (processing path 524) charge must be removed from the synapse cell using an erase operation. The processing logic for the erase operation will be described below.

Figure 4:
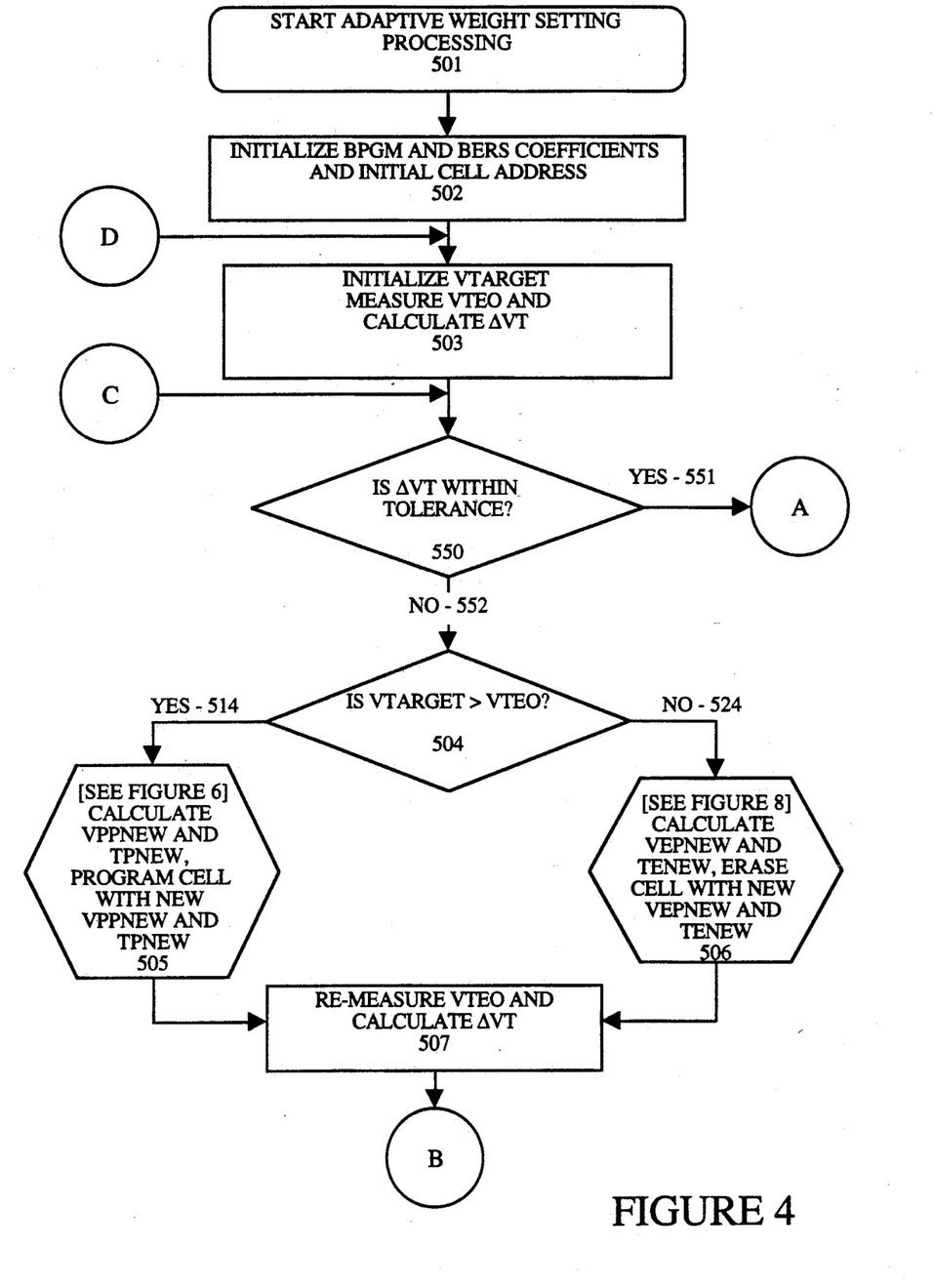
FIGS. 4, 5, 6, 7, 8 and 9 are flow charts illustrating the processing logic for adaptively setting a weight to a synapse cell in a neural network.

In the program cell case where $\Delta V_t$ is greater than zero, processing path 514 is taken to processing box 505. In FIG. 4, processing box 505 is illustrated as a hexagon shape thereby indicating that the logic within box 505 is highlighted in more detail in another flowchart. In this case, the logic within box 505 is detailed in FIG. 6. Thus, the program cell logic in box 505 is implemented as a procedure or subroutine call. In alternative embodiment, the logic for programming a cell may be coded in line without a procedure call.

Figure 6:
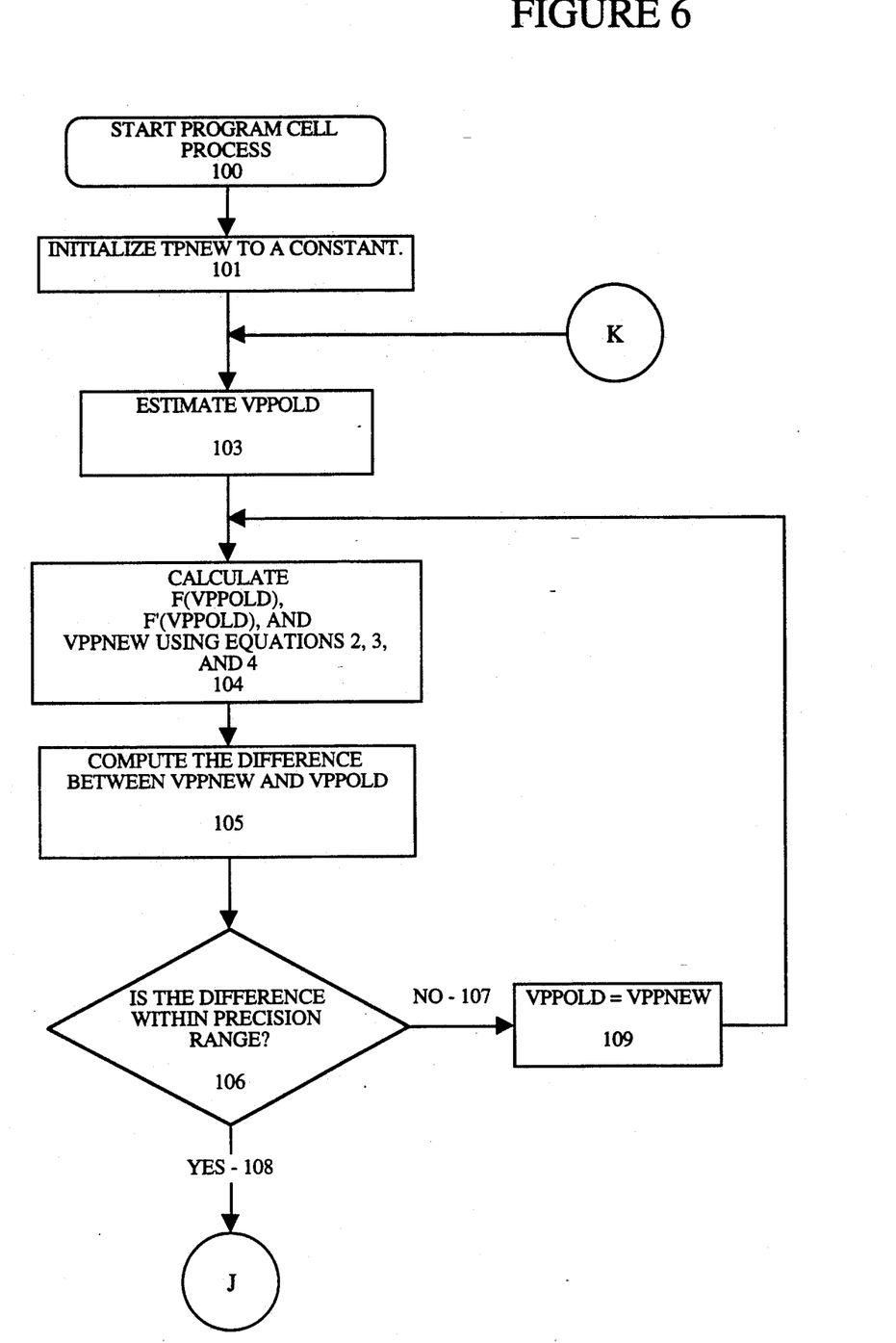

Referring now to FIG. 6, the program synapse cell logic of the present invention is illustrated. After a procedure call is executed in processing box 505 of FIG. 4, control passes a bubble 100 in FIG. 6. Starting at bubble 100, a voltage pulse must be generated and applied to the addressed synapse cell in order to boost the stored charge to the $V_{target}$ level. The appropriate voltage pulse is generated by determining the correct amplitude and duration of the pulse, given the coefficient $B_{pgm}$. The necessary voltage pulse is illustrated in FIG. 2.

Figure 2:
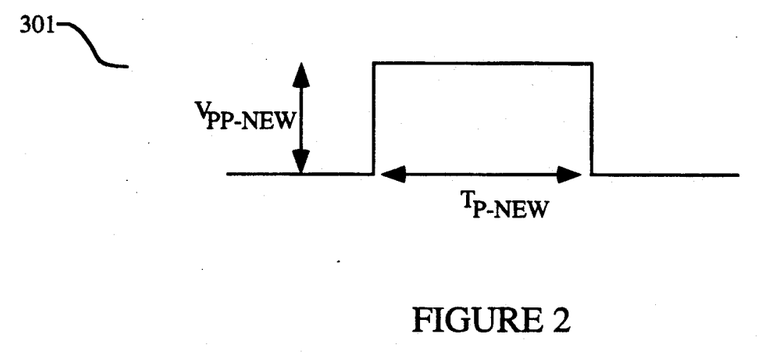
FIG. 2 is an illustration of a programming voltage pulse.

Referring now to FIG. 2, a voltage pulse 301 is depicted with an amplitude $V_{pp.new}$ and a duration $T_{p.new}$. Since the amount of charge transferred onto a synapse cell is dependent upon both the amplitude and duration of the applied pulse, a synapse cell can be programmed to the desired level by varying either or both the amplitude and/or the duration of the applied voltage pulse. In order to generate the appropriate voltage pulse, therefore, it is necessary to determine the value of $V_{pp.new}$ and $T_{p.new}$ given the known values of $B_{pgm}$, $V_{target}$, $V_{teo}$, and $\Delta V_t$. These values are computed by the processing logic depicted in FIGS. 6 and 7.

Referring again to FIG. 6, processing begins at processing box 101. In order to determine the program pulse amplitude $V_{pp.new}$, the pulse duration $T_{p.new}$ is initially fixed at a constant value (processing box 101).

In the preferred embodiment, $T_{p.new}$ is initially fixed at approximately 50 microseconds.

In the next series of processing steps from processing box 102 to processing box 109, the value of $V_{pp.new}$ is calculated using an iterative convergence technique. By repeatedly executing the equations given below, $V_{pp.new}$ converges to a value within a predetermined precision range or tolerance of its value during the previous iteration ($V_{pp.old}$). After each iteration, the newly computed value ($V_{pp.new}$) is compared with its value from the previous iteration. If the difference is not within the predetermined range of precision, $V_{pp.old}$ is replaced by $V_{pp.new}$ and a new calculation for $V_{pp.new}$ is performed as follows:

$$V_{pp.new} = V_{pp.old} - [f(V_{pp.old})/f'(V_{pp.old})] \quad (2)$$

Equation 2 is a general equation to solve for $V_{pp}$ given a solution to $f(V_{pp})=0$. The functional equations specified in equation 2 are defined as follows:

$$f(V_{pp.old}) = \quad (3)$$

$$V_{to} + V_{pp.old} - \Delta V_t - V_{teo} - \frac{1.375 * 10^{-6} * B_{pgm}}{\log(A + B)}$$

$$f'(V_{pp.old}) = \quad (4)$$

$$\frac{1 - (A * (B_{pgm})^2)}{E_o^2 * (A + B) * (\log(A + B))^2}$$

where, $V_{to}$ = a constant empirically found for particular type of synapse cell; in the preferred embodiment this value is approximately 0.5 volts;

$A = e^{(B_{pgm}/E_o)}$ $B = 3.242 * 10^4 * B_{pgm} * T_{p.new}$ $E_o = 7.273 * 10^5 * (V_{pp.old} + V_{to} - V_{teo})$ Solving for $V_{pp.new}$ and $V_{pp.old}$ in equations 2-4 can be performed using the Newton-Raphson method; however, other numerical methods can be used without departing from the scope of the invention. For example, the Newton-Raphson method is used to produce a solution to $f(V_{pp.old})=0$. The use of the Newton-Raphson method to produce this solution is a well known technique. With this solution for $f(V_{pp.old})=0$, an initial value for $V_{pp.old}$ can be estimated (processing box 103). Next, with the estimated value of $V_{pp.old}$, values for $f(V_{pp.old}), f'(V_{pp.old})$ and $V_{pp.new}$ are generated using equations 2-4 (processing box 104). The difference between the resulting $V_{pp.new}$ and $V_{pp.old}$ is computed (processing box 105) and compared with a predetermined accuracy value to determine if the approximation of $V_{pp.new}$ is within a desired range of precision (decision box 106). If $V_{pp.new}$ is within the specified precision range (processing path 108), the iteration process terminates with the acceptable value of $V_{pp.new}$. Processing then continues at the bubble labeled J in FIG. 7.

However, if $V_{pp.new}$ is not within the specified precision range, $V_{pp.old}$ is assigned the value of $V_{pp.new}$ (processing box 109) and the iteration process is executed again starting at processing box 104, until the value of $V_{pp.new}$ converges to within the specified precision range.

Figure 7:
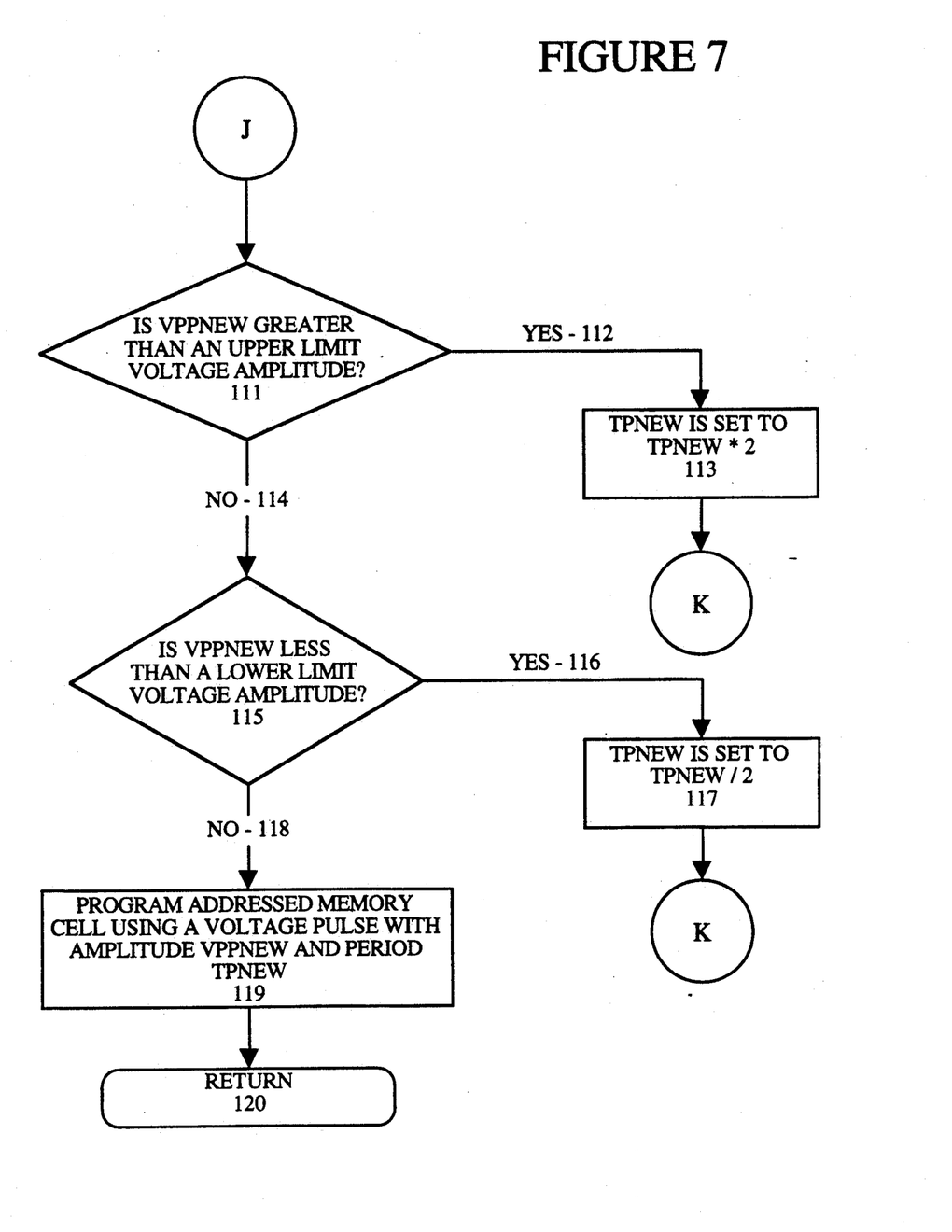

Referring now to FIG. 7, $V_{pp.new}$ has converged to an acceptable value within the specified precision range. At decision boxes 111 and 115, a test is performed to determine if $V_{pp.new}$ is outside of an operable range of voltage amplitude values. Since there are predetermined physical limits to the voltage amplitudes that may be applied to a synapse cell, $V_{pp.new}$ must be set to a value no greater than a maximum voltage amplitude associated with the synapse cell and no smaller than the minimum amplitude for the cell.

If the computed $V_{pp.new}$ value is greater than the maximum allowable amplitude (decision path 112), the duration for the voltage pulse is too short. In this case, $T_{p.new}$ is doubled and set to $T_{pnew}*2$ (processing box 113) and the computation for $V_{pp.new}$ is initiated again starting at processing box 102 in FIG. 6. It will be apparent to those skilled in the art that $T_{p.new}$ may be increased by an amount other than the doubling scheme described herein. If $V_{pp.new}$ is less than the maximum limit (processing path 114), the amplitude value is accepted without further processing and control drops to decision box 115.

At decision box 115, $V_{pp.new}$ is tested against a low amplitude limit. If $V_{pp.new}$ is less than the minimum amplitude value allowed (decision path 116), the voltage pulse duration is too long. Thus, $T_{p.new}$ is halved and set to $T_{p.new}/2$ (processing box 117). Control is then transferred to processing box 102 in FIG. 6 where the computation for $V_{pp.new}$ is initiated again with the new value $T_{p.new}$. Again, it will be apparent to those skilled in the art that $T_{p.new}$ may be decreased by an amount other than the halfing scheme described herein. If $V_{pp.new}$ is greater than the minimum limit (processing path 118), the amplitude value is valid without modification. Thus, control drops processing box 119.

Once an acceptable $V_{pp.new}$ and corresponding $T_{p.new}$ has been computed, the addresses synapse cell can be programmed. The cell is programmed by generating a voltage pulse of $V_{pp.new}$ amplitude and $T_{p.new}$ duration and transmitting the pulse to the addressed synapse cell via weight setting lines 610 (processing box 119). Processing control then returns to the calling procedure in processing box 505 shown in FIG. 4.

Referring again to FIG. 4, the processing associated with processing box 505 has been completed and the addressed synapse cell has been programmed with the generated voltage pulse. However, if at decision box 504, the difference ($\Delta V_t$) between the target voltage ($V_{target}$) and measured voltage $V_{teo}$) of the addressed cell is less than zero, and erase operation is necessary to reduce the stored charge of the cell from its measured value $V_{teo}$ to the target value $V_{target}$. In this case, processing path 524 is taken to processing box 506 where a series of cell erasing steps are performed in a manner similar to those described for the cell programming steps of processing box 505.

Figure 8:
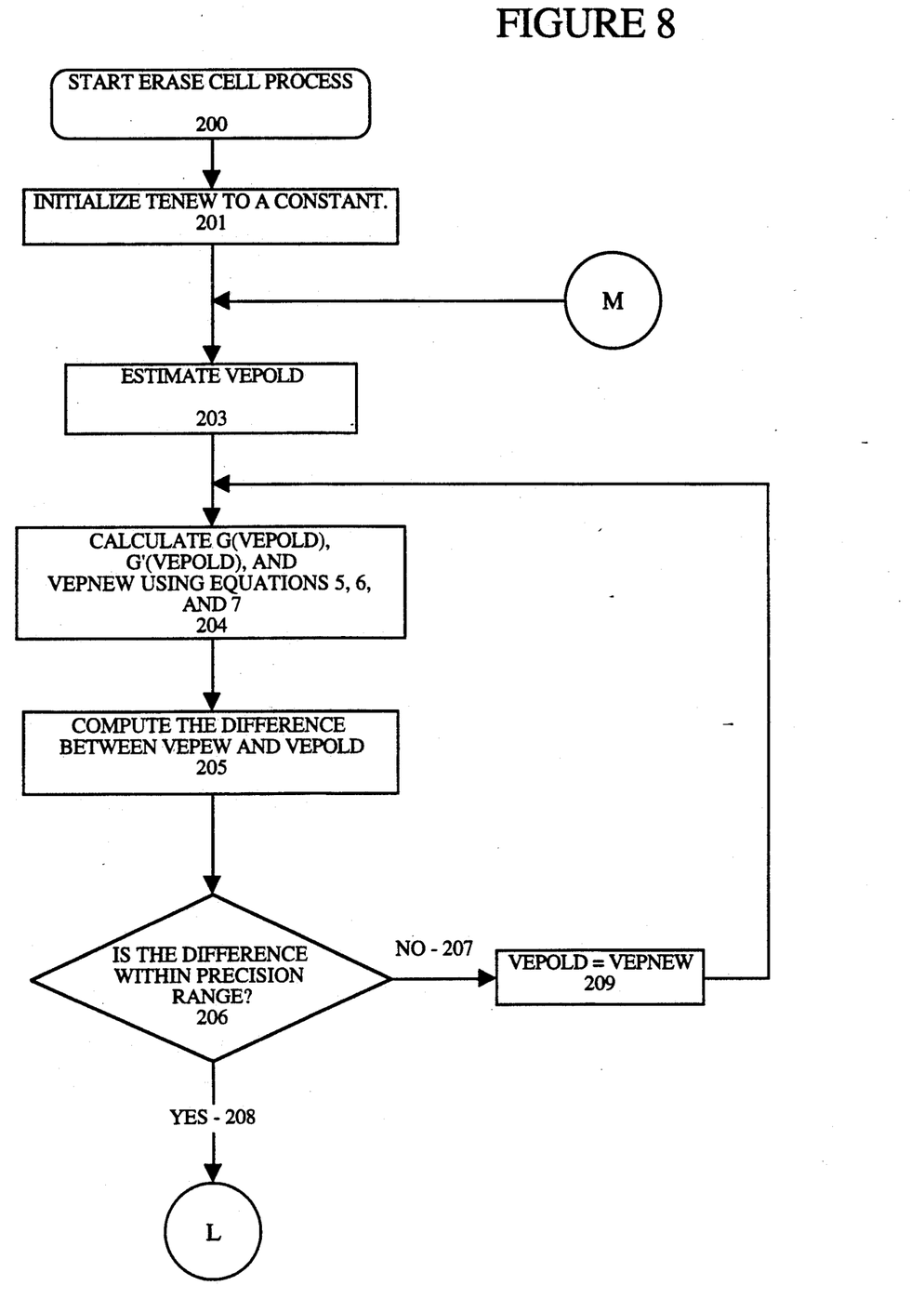

As described above, processing box 506 is illustrated as a hexagon shape indicating that the logic within box 506 is highlighted in more detail in FIG. 8. Thus, the erase cell logic in box 506 is implemented as a procedure or subroutine call. In alternative embodiment, the logic for erasing a cell may be coded in line without a procedure call.

Referring now to FIG. 8, the erase synapse cell logic of the present invention is illustrated. After a procedure call is executed in processing box 506 of FIG. 4, control passes to bubble 200 in FIG. 8. Starting at bubble 200, a voltage pulse must be generated and applied to the addressed synapse cell in order to reduce the stored charge to the $V_{target}$ level. The appropriate voltage pulse is generated by determining the correct amplitude and duration of the pulse, given the coefficient $B_{ers}$. The necessary voltage pulse is illustrated in FIG. 3.

Figure 3:
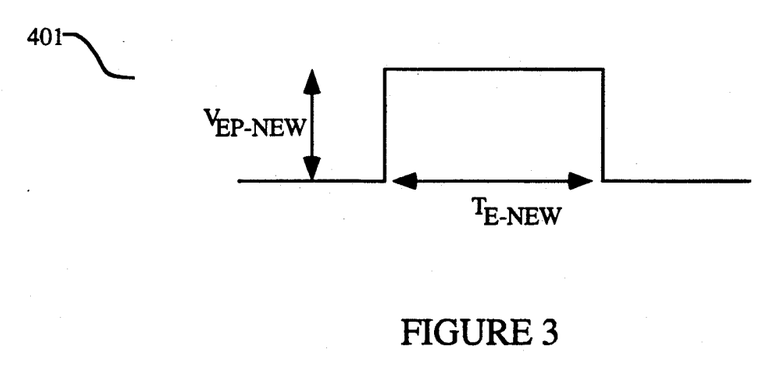
FIG. 3 is an illustration of an erase voltage pulse.

Referring now to FIG. 3, a voltage pulse 401 is depicted with an amplitude $V_{ep.new}$ and a duration $T_{e.new}$. Since the amount of charge transferred from a synapse cell is dependent upon both the amplitude and duration of the applied pulse, a synapse cell can be erased to the desired level by varying either or both the amplitude and/or the duration of the applied voltage pulse. In order to generate the appropriate voltage pulse, therefore, it is necessary to determine the value of $V_{ep.new}$ and $T_{e.new}$ given the known values of $B_{ers}$, $V_{target}$, $V_{teo}$, and $\Delta V_t$. These values are computed by the processing logic depicted in FIGS. 8 and 9.

Referring again to FIG. 8, processing begins at processing box 201. In order to determine the erase pulse amplitude $V_{ep.new}$, the pulse duration $T_{e.new}$ is initially fixed at a constant value (processing box 201). In the preferred embodiment $T_{e.new}$ is initially fixed at approximately 50 microseconds.

In the next series of processing steps from processing box 202 to processing box 209, the value of $V_{ep.new}$ is calculated using an iterative convergence technique. By repeatedly executing the equations given below, $V_{ep.new}$ converges to a value within a predetermined precision range of its value during the previous iteration ($V_{ep.old}$). After each iteration, the newly computed value ($V_{ep.new}$) is compared with its value from the previous iteration. If the difference is not within the predetermined range of precision, $V_{ep.old}$ is replaced by $V_{ep.new}$ and a new calculation for $V_{ep.new}$ is performed as follows:

$$V_{ep.new} = V_{ep.old} - [g(V_{ep.old})/g'(V_{ep.old})] \quad (5)$$

Figure 9:
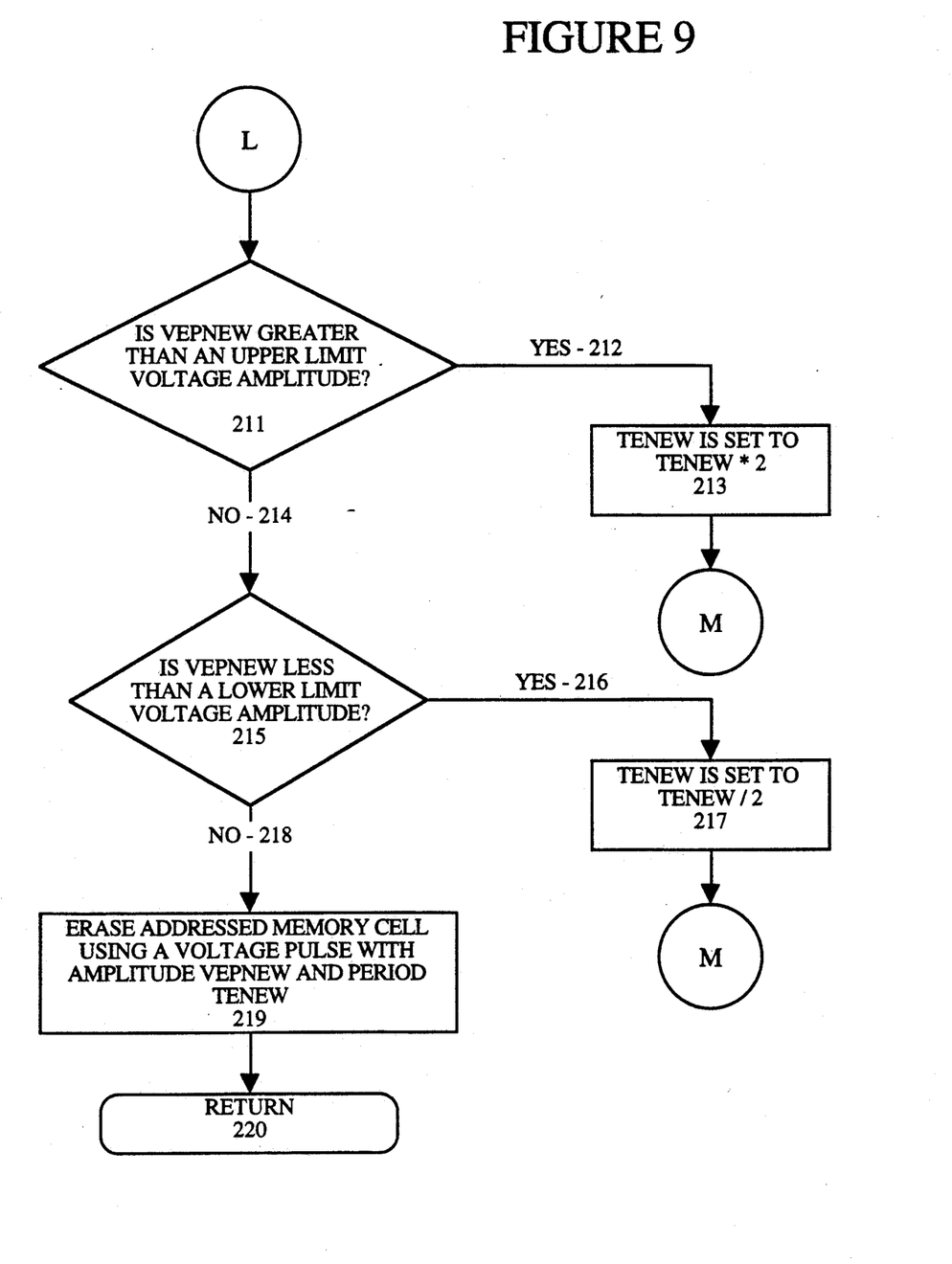

Equation 5 is a general equation to solve for $V_{pp}$ given a solution to $f(V_{pp}) = 0$. The functional equations specified in equation 5 are defined as follows:

$$g(V_{ep.old}) = \quad (6)$$

$$V_{to} - \Delta V_t - V_{teo} - (1.125 * V_{ep.old}) + \frac{1.375 * 10^{-6} * B_{ers}}{\log(C + D)}$$

$$g'(V_{ep.old}) = \quad (7)$$

$$\frac{-1.125 + (1.125 * (B_{ers})^2 * C)}{E_{yo}^2 * (C + D) * (\log(C + D))^2}$$

wherein, $V_{to}$ = a constant empirically found for a particular type of synapse cell; in the preferred embodiment this value is approximately 0.5 volts;
$C = e^{(B_{ers}/E_{yo})}$
$D = 3.242 * 10^4 * B_{ers} * T_{e.new}$
$E_{yo} = (8.182 * 10^5 * V_{ep.old}) + (7.273 * 10^5 * (V_{teo} - V_{to}))$ Solving for $V_{ep.new}$ and $V_{ep.old}$ in equations 5-7 can be performed using the newton-Raphson method; however, other numerical methods can be used without departing from the scope of the invention. Foe example, the Newton-Raphson method is used to produce a solution to $g(V_{ep.old}) = 0$. The use of the Newton-Raphson method to produce this solution is a well known technique. With this solution for $g(V_{ep.old}) = 0$, an initial value for $V_{ep.old}$ can be estimated (processing box 203). Next, with the estimated value of $V_{ep.old}$, values for $g(V_{ep.old})$, $g'(V_{ep.old})$ and $V_{ep.new}$ are generated using equations 5-7 (processing box 204). The difference between the resulting $V_{ep.new}$ and $V_{ep.old}$ is computed (processing box 205) and compared with a predetermined accuracy value to determine if the approximation of $V_{ep.new}$ is within a desired range of precision (decision box 206). If $V_{ep.new}$ is within the specified precision range (processing path 208), the iteration process terminates with the acceptable value of $V_{ep.new}$. Processing then continues at the bubble labeled L in FIG. 9.

However, if $V_{ep.new}$ is not within the specified precision range, $V_{ep.old}$ is assigned the value of $V_{ep.new}$ (processing box 209) and the iteration process is executed again starting at processing box 204, until the value of $V_{ep.new}$ converges to within the precision range.

Referring now to FIG. 9, $V_{ep.new}$ has converged to an acceptable value within the specified precision range. At decision boxes 211 and 215, a test is performed to determine if $V_{ep.new}$ is outside of an operable range of voltage amplitude values. Since there are predetermined physical limits to the voltage amplitudes that may be applied to a synapse cell, $V_{ep.new}$ must be set to a value no greater than a maximum voltage amplitude associated with the synapse cell an no smaller than the minimum amplitude for the cell.

If the computed $V_{ep.new}$ value is greater than the maximum allowable amplitude (decision path 212), the duration for the voltage pulse is too short. In this case, $T_{e.new}$ is doubled and set to $T_{e.new}*2$ (processing box 213) and the computation for $V_{ep.new}$ is initiated again starting at processing box 202 in FIG. 8. It will be apparent to those skilled in the art that $T_{e.new}$ may be increased by an amount other than the doubling scheme described herein. If $V_{ep.new}$ is less than the maximum limit (processing path 214), the amplitude value is accepted without further processing and control drops to decision box 215.

At decision box 215, $V_{ep.new}$ is tested against a low amplitude limit. If $V_{ep.new}$ is less than the minimum amplitude value allowed (decision path 216), the voltage pulse duration is too long. Thus, $T_{e.new}$ is halved and set to $T_{e.new}/2$ (processing box 217). Control is then transferred to processing box 202 in FIG. 8 where the computation for $V_{ep.new}$ is initiated again with the new value of $T_{e.new}$. Again, it will be apparent to those skilled in the art that $T_{e.new}$ may be decreased by an amount other than the halfing scheme described herein. If $V_{ep.new}$ is greater than the minimum limit (processing path 218), the amplitude value is valid without modification. Thus, control drops processing box 219.

Once an acceptable $V_{ep.new}$ and corresponding $T_{e.new}$ has been computed, the addressed synapse cell can be erased. The cell is erased by generating a voltage pulse of $V_{ep.new}$ amplitude and $T_{e.new}$ duration and transmitting the pulse to the addressed synapse cell via weight setting lines 610 (processing box 219). Processing control then returns to the calling procedure in processing box 506 shown in FIG. 4.

Referring again to FIG. 4, the processing associated with processing box 505 and 506 has bene completed and the addressed synapse cell has been either programmed or erased with the generated voltage pulse. After either erasing or programming the cell, $V_{teo}$ of the cell is re-measured at step 507. The difference in voltage, $\Delta V_t$, between $V_{target}$ and the newly re-measured $V_{teo}$ is calculated (processing box 507) using equation 1. Processing control is then transferred to the bubble labeled B in FIG. 5.

Figure 5:
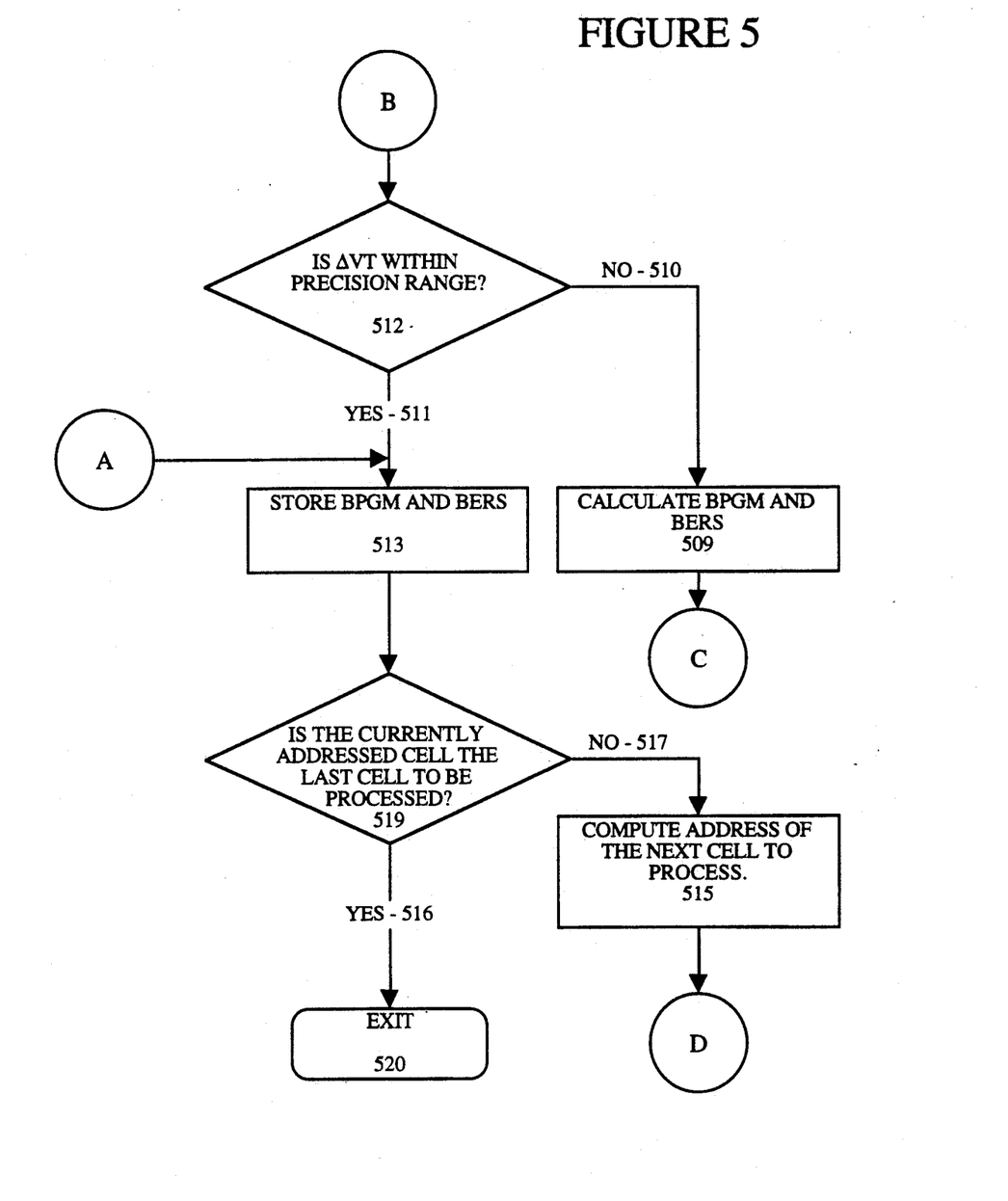

Referring now to FIG. 5, processing continues at decision box 512 where the newly re-calculated $\Delta V_t$ is tested against an acceptable precision value. If $\Delta V_t$ is within a predetermined acceptable percent error, less than approximately 1% in the preferred embodiment, processing path 511 is taken to processing box 513. However, if $\Delta V_t$ is not within a predetermined acceptable precision range, the weight of the synapse cell has not been properly set during the program or erase operations. In this case, processing path 510 is taken to processing box 509.

Processing box 509 is executed when the predicted level of charge on the synapse cell has not been achieved as expected. This condition may occur because of the effects of the various physical phenomena of the synapse cell as described earlier. The present invention, however adaptively adjusts for these effects by producing a new set of coefficients, Bpgm and Bers that are better able to predict the level of charge actually achieved based on the results just measured. In this manner, the synapse cell weight setting process occurs more quickly, more accurately, and with fewer processing iterations.

In processing box 509, $B_{pgm}$ is recalculated from the following equations:

$$B_{pgm} = B_{pgm.old} - h(_{pgm.old})/h(B_{pgm.old}); \quad (8)$$

$$h(B_{pgm.old}) = [X^*(\log(A+B))] - B_{pgm.old}; \quad (9)$$

$$h(B_{pgm.old}) = [X^*((A/E_O) + Y)/(A+B)] - 1 \quad (10)$$

where,
A, B, $E_O$, and $V_{to}$ are given above;
$X = 7.273 * 10^5 * (V_{to} + V_{pp.new} - \Delta V_t - V_{teo})$ and;
$Y = 3.242 * 10^4 * T_{p.new}$.

Thus, with the recalculated $V_{teo}$, and re-measured $\Delta V_t$ and new voltage pulse values $V_{pp.new}$ and $T_{p.new}$, $B_{pgm}$ and $B_{pgm.old}$ are regenerated using the iterative method as described above for the calculation of $V_{pp.new}$.

In addition, $B_{ers}$ is re-calculated from the following similar equations:

$$B_{ers} = B_{ers.old} - [k(B_{ers.old})/k(B_{ers.old})] \quad (11)$$

$$k(B_{ers.old}) = [W^*(\log(C+D))] - (1.375 * 10^{-6} * B_{ers.old}) \quad (12)$$

$$k(B_{ers.old}) = [W^*C/(Eyo^*(C+Z))] - (1.375 * 10^{-6}) \quad (13)$$

where,
C, D, Eyo, and $V_{to}$ are given above;
$W = V_{teo} + \Delta V_t - V_{to} + (1.125 * V_{ep.new})$ and;
$Z = 3.242 * 10^4 * T_{e.new}$.

Again, with the recalculated $V_{teo}$, and re-measured $\Delta V_t$ and new voltage pulse values $V_{ep.new}$ and $T_{e.new}$, $B_{ers}$ and $B_{ers.old}$ are re-generated using the Newton-Rephson method as described above for the calculation of $V_{ep.new}$.

Once new $B_{pgm}$ and $B_{ers}$ coefficients are recalculated in processing box 509, a new iteration for the currently addressed cell begins again at the bubble labeled C in FIG. 4. This iteration process continues until $\Delta V_t$ is within a predetermined acceptable precision range as tested in decision box 512.

When $\Delta V_t$ achieves an acceptable value, processing path 511 is taken to processing box 513 as shown in FIG. 5. At box 513, $B_{pgm}$ and $B_{ers}$ coefficients are stored. The stored coefficients represent values that produced an actual measured weight of a synapse cell that corresponded with the predicted value. These values can be stored in a reserved area of memory in the control logic/memory 640 of the network shown in FIG. 1a. Processing proceeds to decision box 519.

At decision box 519, test is performed to determine if all synapse cells have been processed. The entire neural network may be processed or only a portion thereof. A portion of the network is specified by initially providing the processing logic with an address or range of addresses used to limit the weight setting process. If the synapse cell currently addressed in the network is the last cell in the specified address range, processing path 516 is taken to bubble 520 where the weight set processing of the present invention terminates. If the synapse cell currently addressed in the network is the not last cell in the specified address range, processing path 517 is taken to processing box 515. At processing box 515, the current synapse cell address is incremented to point to a synapse cell adjacent to the one previously processed. Control then transfers to the bubble labeled D in FIG. 4. Because the previously processed cell is physically close to the newly addressed cell, the similarity in physical characteristics between the two cells will enable the $B_{pgm}$ and $B_{ers}$ coefficients of the previously addressed cell to be effectively used as the process repeats at step 503 for the adjacent and now currently addressed cell. $B_{ers}$ and $B_{pgm}$ coefficients from one cell to an adjacent cell will typically be very close to the same value. Therefore, by initially setting accurate values for $B_{pgm}$ and $B_{ers}$ for the adjacent synapse cell, convergence to the target value, $V_{target}$, for the adjacent cell will occur with fewer iterations than required for a non-adaptive process.

Although this invention has been shown in relation to a particular embodiment, it should not be considered so limited. Rather, it is limited only by the appended claims.

What is claimed is:

1. In a neural network having electronic synapse cells each having a weighting component, said weighting component for storing a weight of said synapse cell, a process for adaptively setting said weight comprising the steps of:

a) generating and applying a voltage pulse having an amplitude and duration to said weighting component;

b) measuring said weight stored in said weighting component;

c) determining a correction factor to said amplitude and duration of said voltage pulse to produce a corrected voltage pulse necessary to minimize the difference between a target weight and said weight measured in said measuring step, said correction factor including a coefficient representing the physical characteristics of said synapse cell, said coefficient associated with programming and erasing said synapse cell, said determining a correction factor step further includes the steps of:

i) determining the difference between a target weight and said measured weight of said weighting component;

ii) producing a programming coefficient if said difference is positive, said programming coefficient produced as a function of said difference and said measured weight, said programming coefficient also being a function of another programming coefficient and another voltage pulse used in programming a different synapse cell; and iii) producing an erasing coefficient if said difference is negative, said erasing coefficient produced as a function of said difference and said measured weight, said erasing coefficient also being a function of another erasing coefficient and another voltage pulse used in erasing a different synapse cell;

d) applying said corrected voltage pulse to said synapse cell to alter said weight of said synapse cell.

2. The process as claimed in claim 1 wherein said step of determining a correction factor further includes a step of initializing a correction factor based on a correction factor previously determined for a different synapse cell.

3. The process as claimed in claim 1 further including a step of addressing a different synapse cell in said network.

4. The process as claimed in claim 1 wherein said correction factor further includes a first coefficient associated with programming said synapse cell and a second coefficient associated with erasing said synapse cell.

5. The process as claimed in claim 1 further including the steps of:
determining a synapse cell address of said synapse cell for which said weight is to be set; and
incrementing said synapse cell address to point to a different synapse cell.

6. The process as claimed in claim 1 further including the steps of:
storing said correction factor after said step of determining a correction factor is performed.

7. The process as claimed in claim 1 wherein said step of determining a correction factor further includes a step of storing said coefficient.

8. A neural network comprising:
a) electronic synapse cells each having a weighting component, said weighting component for storing a weight of said synapse cell;
b) means for generating and applying a voltage pulse having an amplitude and duration to said weighting component;
c) means for measuring said weight stored in said weighting component;
d) means for determining a correction factor to said amplitude and duration of said voltage pulse to produce a corrected voltage pulse necessary to minimize the difference between a target weight and said weight measured by said means for measuring, said correction factor including a coefficient representing the physical characteristics of said synapse cell, said coefficient associated with programming and erasing said synapse cell, said means for determining a correction factor further comprising:
i) means for determining the difference between a target weight and said measured weight of said weighting component;
ii) means for producing a programming coefficient if said difference is positive, said programming coefficient produced as a function of said difference and said measured weight, said programming coefficient also being a function of another programming coefficient and another voltage pulse used in programming a different synapse cell; and
iii) means for producing an erasing coefficient if said difference is negative, said erasing coefficient produced as a function of said difference and said measured weight, said erasing coefficient also being a function of another erasing coefficient and another voltage pulse used in erasing a different synapse cell;

e) means for applying said corrected voltage pulse to said synapse cell to alter said weight of said synapse cell.

9. The neural network as claimed in claim 8 wherein said means for determining a correction factor further includes means for initializing a correction factor based on a correction factor previously determined for a different synapse cell.

10. The neural network as claimed in claim 8 further including means for addressing a different synapse cell in said network.

11. The neural network as claimed in claim 8 wherein said correction factor further includes a first coefficient associated with programming said synapse cell and a second coefficient associated with erasing said synapse cell.

12. The neural network as claimed in claim 8 further including:
means for determining a synapse cell address of said synapse cell for which said weight is to be set; and
means for incrementing said synapse cell address to point to a different synapse cell.

13. The neural network as claimed in claim 8 further including:
means for storing said correction factor after said correction factor is determined.

14. The neural network as claimed in claim 8 wherein said means for determining a correction factor further includes means for storing said coefficient.

15. A system for adaptively setting weights in electronic synapse cells of a neural network, said system comprising:
synapse cells each having a weighting component, said weighting component for storing said weight of said synapse cell;
a control logic/memory unit for measuring said weights and for setting said weights by applying a voltage pulse to each of said weighting components, said control logic/memory unit coupled to said weighting components of said synapse cells by a weight setting line and a weight measuring line;
control logic operably disposed within said control logic/memory unit for determining a correction factor to said amplitude and duration of said voltage pulse to produce a corrected voltage pulse necessary to minimize the difference between a target weight and said weight measured by said control logic/memory unit, said correction factor including a coefficient representing the physical characteristics of said synapse cell, said coefficient associated with programming and erasing said synapse cell, said control logic also determining the difference between a target weight and said measured weight of said weighting component, said control logic also producing a programming coefficient if said difference is positive, said programming coefficient produced as a function of said difference and said measured weight, said programming coefficient also being a function of another programming coefficient and another voltage pulse used in programming a different synapse cell, said control logic also producing an erasing coefficient if said difference is negative, said erasing coefficient produced as a function of said difference and said measured weight, said erasing coefficient also being a function of another erasing coefficient and another voltage pulse used in erasing a different synapse cell.

16. The system as claimed in claim 15 wherein said correction factor includes a first coefficient associated with programming said synapse cell and a second coefficient associated with erasing said synapse cell.

17. The system as claimed in claim 15 wherein said control/logic memory unit further including:
means for determining a synapse cell address of said synapse cell for which said weight is to be set; and
means for incrementing said synapse cell address to point to a different synapse cell.

18. The system as claimed in claim 15 wherein said control/logic memory unit further including:
means for storing said correction factor determined by said control logic.

19. The system as claimed in claim 15 wherein each said weighting component further includes a floating gate device, said weight corresponding to an amount of charge stored on said floating gate device.

20. The system as claimed in claim 15 wherein said control logic/memory unit further includes memory means for storing said control logic, said control logic/memory unit further includes a processor for executing said control logic.

* * * * *

UNITED STATES PATENT AND TRADEMARK OFFICE
CERTIFICATE OF CORRECTION

PATENT NO. : 5,247,606
DATED : Sep. 21, 1993
INVENTOR(S) : Simon M. Tam

It is certified that error appears in the above-indentified patent and that said Letters Patent is hereby corrected as shown below:

Column 1, line 68, Delete "an"; Insert in place thereof --a--
Column 8, line 46, Delete "a" ; Insert in place thereof --to--
Column 9, line 16, Delete second "f"; Insert in place thereof --f´--
Column 9, line 26, Delete "f" ; Insert in place thereof --f´--
Column 9, line 32, Between "for" and "particular"; Insert --a--
Column 9, line 48, Delete second "f"; Insert in place thereof --f´--
Column 10, line 42, Delete "call"; Insert in place thereof --cell--
Column 11, line 33, Delete second "g"; Insert in place thereof--g'--
Column 11, line 56, Delete "newton"; Insert in place thereof --Newton--
Column 12, line 20, Delete "an"; Insert in place thereof --and--
Column 13, line 24 Delete second "h"; Insert in place thereof --h'--
Column 13, line 28, Delete "h"; Insert in place thereof --h´--
Column 13, line 41, Delete second "k"; Insert in place thereof--k'--
Column 13, line 54, Delete "Rephson"; Insert in place thereof --Raphson--
Column 15, line 28, Delete "steps"; Insert in place thereof --step--

Signed and Sealed this

Tenth Day of October, 1995

Attest:

BRUCE LEHMAN

Attesting Officer        Commissioner of Patents and Trademarks